United States Patent [19]
Francois

[11] 3,722,691
[45] Mar. 27, 1973

[54] FILTER FOR REMOVING PARTICULATE CONTAMINANTS FROM FLUIDS

[76] Inventor: Paul L. Francois, 46 Northover Place, Red Bank, N.J.

[22] Filed: Mar. 3, 1971

[21] Appl. No.: 120,668

[52] U.S. Cl. ............... 210/304, 210/443, 210/456, 210/DIG. 17
[51] Int. Cl. ................. B01d 21/00, B01d 27/00
[58] Field of Search ............... 210/299, 304–306, 210/440, 443, 456–458, DIG. 17

[56] References Cited

UNITED STATES PATENTS

| | | | |
|---|---|---|---|
| 3,272,336 | 9/1966 | Humbert, Jr. | 210/456 X |
| 1,822,006 | 9/1931 | Bull | 210/304 |
| 3,402,529 | 9/1968 | Frantz | 210/304 X |
| 3,392,838 | 7/1968 | Petrucci | 210/440 X |
| 3,224,585 | 12/1965 | Scavuzzo et al. | 210/443 X |
| 1,175,948 | 3/1916 | French | 210/304 |
| 3,473,666 | 2/1967 | Humbert, Jr. | 210/443 X |

Primary Examiner—Samih N. Zaharna
Assistant Examiner—R. W. Burks
Attorney—Popper, Bain, Bobis & Gilfillan

[57] ABSTRACT

A filter for removing particulate contaminants from fluids such as oil comprising a filter element in a generally cylindrical, thin walled plastic housing having a base threadably engaged to fluid inlet and outlet means, commonly known as a spin-on filter in which the housing is provided with fluid flow interruption means for enhancing the deposition and collection of particulate debris said means including internal, sharp angled convolutions, radial or helical, said means also including fluid inlet passages in the base oriented at an angle to the longitudinal axis of the housing.

30 Claims, 9 Drawing Figures

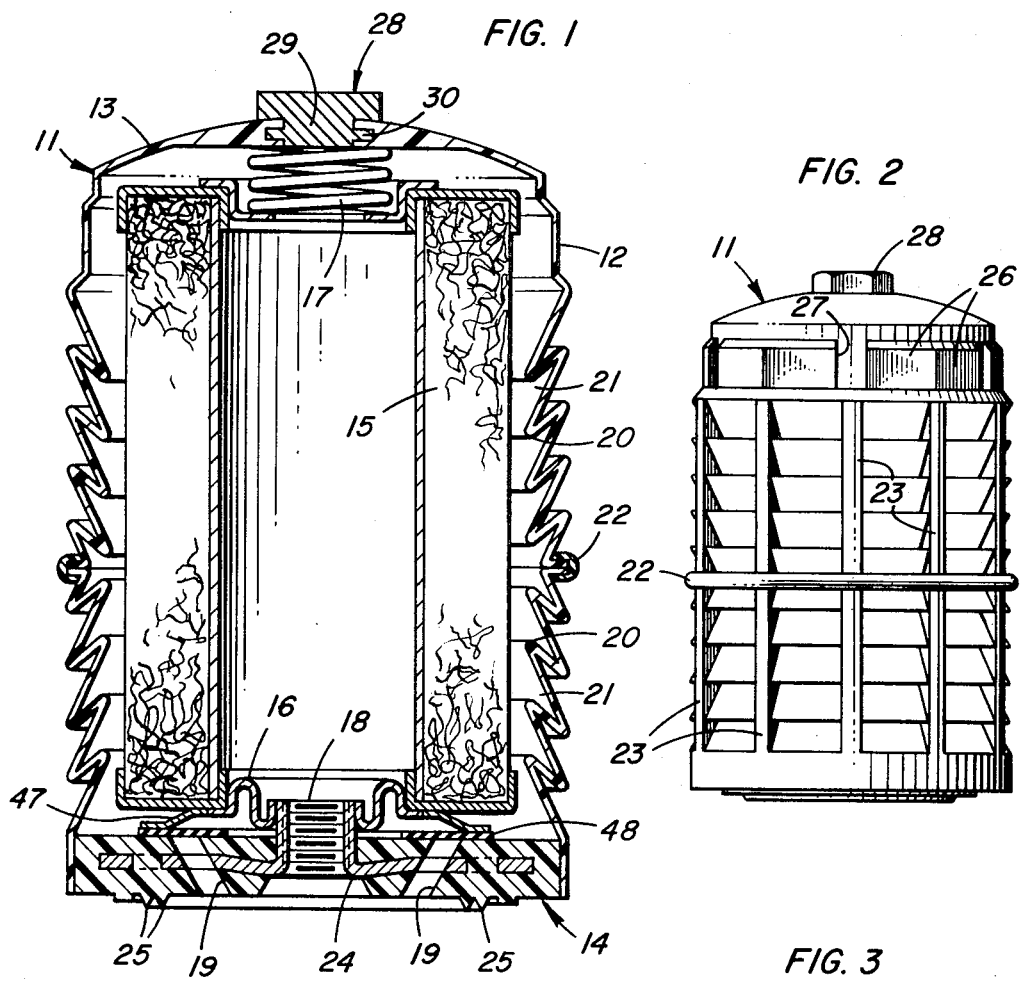
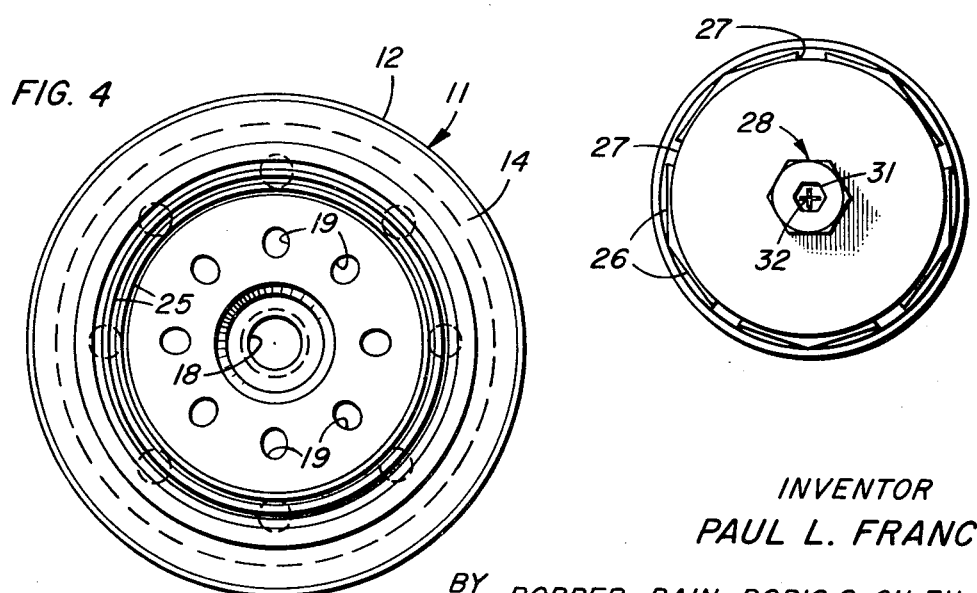

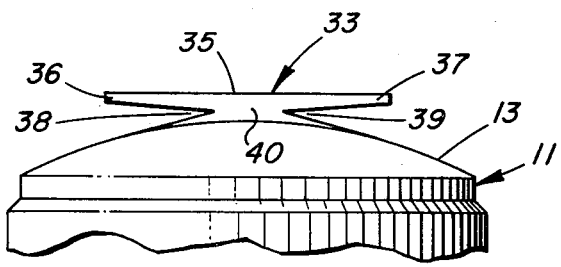
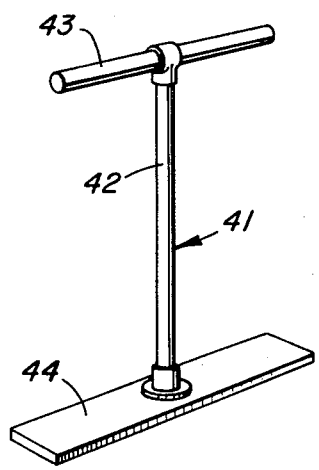
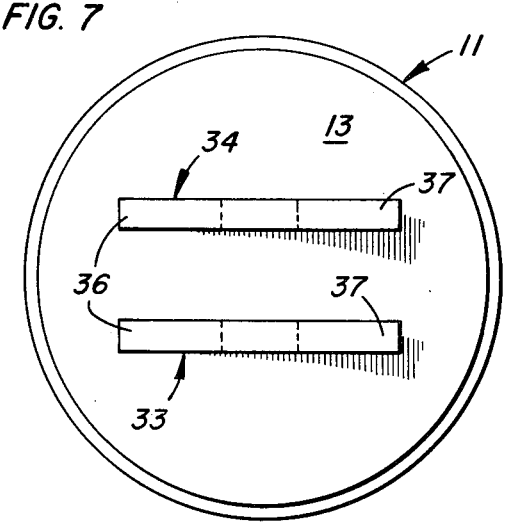
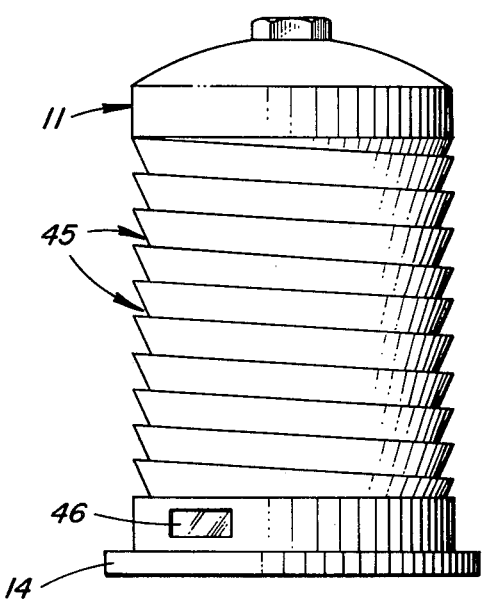
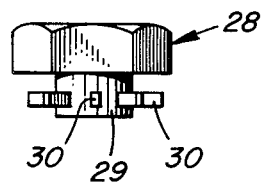

3,722,691

FILTER FOR REMOVING PARTICULATE CONTAMINANTS FROM FLUIDS

BACKGROUND OF INVENTION

The field of my invention is fluid filters generally and more specifically oil filters for internal combustion engines of the spin-on variety.

Known spin-on oil filters employ a metal housing comprising a thin, internally smooth, generally cylindrical shell enclosing a suitable annular filter cartridge spaced away from the internal walls of the housing. Oil is introduced into the housing through the base into the space between the internal wall of the housing and the external surface of the annular filter cartridge flowing through the filter cartridge and from there downwardly through the center of the filter annular to a discharge port.

In the spin-on variety filter, the filter is mounted to the engine by threadably engaging a stand pipe in a threaded bore on the base of the housing, which bore serves as discharge means. Means are provided on the exposed top of the housing whereby it may be rotated for threadable engagement on the stand pipe. Fluid is introduced through the base of the housing by means of passages positioned radially with respect to the central or axial discharge passage.

Existing filters are relatively inefficient and have a limited contaminant storage capacity defined by the capacity of the filter cartridge itself.

The present invention relates to a filter construction in which the housing is provided with internal, fluid flow interrupting means to insure rapid changes in fluid flow enhancing the deposition of particulate contaminants. In addition, said means also provide space for the storage of contaminants, separate and distinct from the filter cartridge.

It is extremely difficult and costly to invest a thin walled metal housing with the proper fluid flow interrupting means. Therefore, the present invention employs a housing and a base fabricated of a suitable synthetic material such as plastic.

However, it is well known that most plastics lose rigidity at elevated temperatures commonly encountered in engine oil. Nevertheless, the fluid flow interrupting means function to contribute some degree of structural rigidity to the housing resistant to temperature rise. Moreover, I contemplate the use of structural supplements external to the housing but integral therewith which render the housing structurally sound at all operating temperatures.

It is also highly desirable that the filter be easily installed and removed by the use of simple, readily available tools. Therefore, universal manipulation means for effecting rotation of the housing have been provided.

Thus, it is among the objects and advantages of the present invention to provide a filter construction in which a housing is provided with internal fluid, flow interrupting means.

Another object of the invention is to provide a fluid filter in which fluid inlet means are provided to insure swirling, turbulent fluid flow within the housing.

Still another object of the invention is to provide a fluid filter having a housing fabricated of some suitable synthetic material such as plastic having universal manipulation means for installation and a relatively inexpensive plastic sealing means surrounding both the means for introduction of fluid and the means for discharge thereof.

SUMMARY OF INVENTION

A filter for removing particulate contaminants from fluids comprising a hollow housing closed at one end and having fluid inlet and outlet means in the opposite end, filter means in the housing in intercepting relationship to the flow of fluid in the housing, and fluid flow interrupting means on the internal walls of the housing.

PREFERRED EMBODIMENT OF INVENTION

The objects and advantages aforesaid as well as other objects and advantages may be achieved by the filter, a preferred embodiment of which is illustrated in the drawings in which:

FIG. 1 is a side elevational, cross-sectional view of my proposed filter construction;

FIG. 2 is a side elevational view of the filter illustrated in FIG. 1;

FIG. 3 is a top plan view of the filter housing;

FIG. 4 is a bottom plan view of the filter;

FIG. 5 is a side elevational view of universal rotational manipulation means attached to the top of the housing;

FIG. 6 is a side elevational, partially broken away view of the top of a filter housing showing an alternate form of universal rotation means;

FIG. 7 is a top plan view of the housing illustrated in FIG. 6;

FIG. 8 is a view in perspective of a manipulating tool for use on the form of universal rotation means illustrated in FIGS. 6 and 7;

FIG. 9 is a side elevational view of an alternate form of filter housing.

Referring now to the drawings in detail, the filter comprises a housing 11 having generally cylindrical side walls 12 and a domed top 13 closing one end thereof. Closure or base means 14 are seated in and attached to the opposite end of the housing 11.

A generally annular filter cartridge 15 is seated within the housing 11. The filter cartridge 15 rests on top of an annular seat 16 and is maintained in position by a retaining spring 17. The basic inter-arrangement of parts as hereinbefore described is well known in the art and need be detailed no further.

The base 14 is provided with an axial, transverse, threaded passage 18 which provides discharge means for fluid within the housing 11. In addition, the base 14 is provided with a plurality of transverse passages 19 positioned radially with respect to the discharge passage 18. The passages 19 provide means for the introduction of fluid into the housing 11. Sealing means are defined by a rubber gasket 48 positioned on top of the base 14 extending over the inlet ends of passages 19. A spring 47 between the filter cartridge 15 and the gasket 48 insure closure of the passages 19 when fluid pressure is greater within the cartridge than within the passages 19.

The radial, input passages 19 are oriented at an angle to the longitudinal axis of the housing 11 and threaded bore 18 generally flaring radially outwardly towards the internal side wall 12 of the housing 11. Thus, fluid passing through passages 19 enter the housing 11 in a swirling fashion. In order to create even greater turbulent flow with rapid increases and decreases in velocity and direction, fluid flow interrupting means are provided on the internal side of wall 12 of the housing 11. The drawings, illustrate one such means as a plurality of sharp-angled, generally radial convolutions 20. The convolutions 20 provide radial grooves 21 defining additional storage means for particulate contaminants. The wall 12 of the housing 11 is relatively thin and the external surface thereof conforms to the shape and dimension of the convolutions 20.

The housing 11 may be fabricated of some suitable synthetic material such as plastic. In order to accommodate for molding techniques, the housing 11 is fabricated in two shells along a plane transverse to its long dimension. In the top half, the apexes of the convolutions 20 are oriented downwardly whereas, on the bottom half, the apexes convolutions 20 are oriented upwardly. The two shells are joined at a central seam 22.

Most plastics are thermally sensitive, losing substantial structural strength with rising temperatures. Nevertheless, the convolutions 20 with which the side walls 12 of the housing 11 are invested, contribute greatly to structural strength at all operating temperatures. In addition, a number of radial, longitudinally extending cooling fins have been provided as well as reinforcing ribs 23 on the external surface of the wall 12.

The base 14 is also fabricated of plastic. However, it is desirable to fabricate the threaded central passage 18 of metal. Thus, I have provided a metal insert 24 which is molded into the base 14. This metal insert 24 also provides the necessary mass to rapidly rotate the base 14 within the confines of the side wall 12 of the housing 11 during fabrication until frictional forces generate sufficient heat for fusion. However, the base 14 may be attached to the housing 11 by either an adhesive or by heat sealing.

In known spin-on filters, elaborate, expensive and frequently easily damaged gasket or sealing means must be provided on the bottom of the housing in order to insure against leakage. However, since the base 14 of my filter is fabricated of plastic very simple, easily fabricated, annular rib or laborynth seals 25, 25 may be employed. Since the ribs 25 are slightly deformable, they need not be fabricated with great precision nor must the complementary seat be so fabricated. Rather, when the housing 11 is forced downwardly by rotation about the stand pipe, the ribs 25, 25 deform sufficiently to insure intimate sealing at all points.

It is vital that the filter be easily engaged and disengaged from the stand pipe. Many filters are manufactured with means on the top of the housing for effecting rotation thereof requiring special tools. However, my structure is of a universal variety adapted for manipulation by any ordinary wrench or screwdriver. In order to accomplish this end, a series of intersecting flats 26, 26 separated by generally U-shaped recesses 27 have been provided. Such a configuration may be manipulated by an open, polygonal ring having the same number of sides as flats 26, 26 or by such a ring with inwardly extending radial teeth to mate with grooves 27. However, additional means are provided in the form of a metal hexagonal nut 28 molded into the top 13 of the housing 11. The embedded base 29 of the nut 28 is provided with a plurality of radial teeth 30 to insure rotation of the housing 11 with the nut 28. Such a nut may be manipulated by an ordinary open end box or socket wrench. In addition, the top of the nut is provided with both an allen wrench seat 31 and a Phillips-head screwdriver seat 32. Thus, the housing 11 may be rotated by any one of a wide variety of both special and common tools.

An alternate form of universal rotation means for the housing 11 is illustrated in FIGS. 6 and 7. Such means comprise a pair of identical, spaced apart cams 33 and 34. Each of the cams 33 and 34 are secured to the top 13 of the housing 11 and comprise generally a flat top 35 and a pair of opposed wings 36 and 37 spaced away from the top 13 of the housing 11 at opposite ends of the cam 33. The wings 36 and 37 define with the top 13 of the housing 11 a pair of opposed generally V-shaped radial grooves 38 and 39. The central portion 40 of the cams 33 and 34 are attached to the top 13 of the housing 11.

A tool 41 for manipulation of the universal rotation means illustrated in FIGS. 6 and 7 is illustrated in FIG. 8. Tool 41 comprises a shaft 42 having a handle 43 secured thereto at one end and a flat cross member 44 secured to the opposite end. In operation, the flat cross member 44 is positioned between the cams 33 and 34. Rotation of the shaft 41 by means of the handle 43 intrudes the opposed ends of the cross member 44 into opposing grooves 38-39 of opposing cams 33 and 34 in the direction of rotation. The cross member 44 is wedged into the respective grooves 38 and 39 until it can go no further whereupon further rotation of the shaft 41 causes the entire filter housing 11 to rotate on the stand pipe for either engagement or disengagement.

In FIG. 9 an alternate form of housing 11 is illustrated. The housing 11 is substantially the same as the housing 11 illustrated in FIGS. 1 and 2. However, instead of radial convolutions 20, helical convolutions 45 are provided which are sharply angular in form as are the convolutions 20 in FIGS. 1 and 2. The helical convolutions 45 impart a swirling helical motion to the fluid intruded between the inside wall of the housing 11 and the filter cartridge 15. This swirling motion further enhances the deposition and collection of particulate contaminants.

FIG. 9 also illustrates a transparent window 46 in the base of the housing 11 in order to view the degree of collection of contaminants therewithin.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed is:

1. A filter for removing particulate contaminants from fluids comprising,
   a. a hollow housing closed at one end,
   b. a base on the housing closing the opposite end, the base having transversely extending fluid inlet means and fluid outlet means, c. filter means in the housing in intercepting relationship to the flow of fluid in the housing between the said inlet and outlet means in the base, d. a plurality of angular, relatively deep, generally radially disposed grooves on the internal surface of at least a substantial portion of the side wall of the housing, and e. the filter means being spaced away from the side wall of the housing opposite said grooves.

2. A filter for removing particulate contaminants from fluids comprising, a. the structure in accordance with claim 1 and, b. a side wall on the filter means immediately opposite the said grooves on the internal surface of the side wall of the housing, c. at least a portion of said fluid flow passing inwardly through said side wall on the filter means directly from the proximity of said grooves.

3. A filter for removing particulate contaminants from fluids comprising, a. the structure in accordance with claim 1 in which b. the filter is provided with an internal passage extending from end to end thereof which communicate with said outlet means in the base, c. fluid flow blocking means at the end of the passage distal to the base, d. fluid flow blocking means at the end of the filter means proximal to the base and intermediate the inlet and outlet means, e. a side wall on the filter means immediately opposite the said grooves on the internal surface of the side wall of the housing, f. all of said fluid flow passing inwardly through said side wall on the filter means directly from the proximity of the side wall of said housing.

4. A filter for removing particulate contaminants from fluids comprising, a. the structure in accordance with claim 1 in which b. the side wall of said housing is of generally uniform thickness at said internal grooves.

5. A filter for removing particulate contaminants from fluids comprising, a. the structure in accordance with claim 1 in which, b. the said housing is fabricated from plastic.

6. A filter for removing particulate contaminants from fluids comprising, a. the structure in accordance with claim 4 in which, b. the said housing is fabricated from plastic.

7. A filter for removing particulate contaminants from fluids comprising, a. the structure in accordance with claim 2 in which, b. the side wall of said housing is of generally uniform thickness at said internal grooves, and c. the said housing is fabricated from plastic.

8. A filter for removing particulate contaminants from fluids comprising, a. the structure in accordance with claim 3 in which b. the side wall of said housing is of generally uniform thickness at said internal grooves, and c. the housing is fabricated from plastic.

9. A filter for removing particulate contaminants from fluids comprising, a. the structure in accordance with claim 7 and, b. a plurality of radial fins on the external surface of the housing extending in the direction of the ends thereof.

10. A filter for removing particulate contaminants from fluids comprising, a. the structure in accordance with claim 1 in which, b. the housing is fabricated of plastic, and c. the said interrupting means are a plurality of conforming internal and external radial convolutions in the wall of the housing, and d. a plurality of radial fins on the external wall of the housing extending in the direction of the ends thereof.

11. A filter for removing particulate contaminants from fluids comprising, a. the structure in accordance with claim 10 in which, b. the fins are just sufficiently rigid to prevent undesired deformation of the housing at operating temperatures.

12. A filter for removing particulate contaminants from fluids comprising, a. the structure in accordance with claim 10 in which b. the said radial convolutions are generally parallel to the ends of the housing and the fins are generally perpendicular to the ends of the housing.

13. A filter for removing particulate contaminants from fluids comprising, a. the structure in accordance with claim 1 in which, b. the inlet means are oriented at an angle to the axis of the housing extending between the ends thereof.

14. A filter for removing particulate contaminants from fluids comprising, a. the structure in accordance with claim 6 in which, b. the housing is fabricated from two shells joined together intermediate the ends of the housing, each shell having a generally annular, radially extending integral rib, the respective ribs being joined to each other to form the housing.

15. A filter for removing particulate contaminants from fluids comprising, a. the structure in accordance with claim 8 in which b. the housing is fabricated from two shells joined together intermediate the ends of the housing, each shell having a generally annular, radially extending integral rib, the respective ribs being joined to each other to form the housing.

16. A filter for removing particulate contaminants from fluid comprising, a. the structure in accordance with claim 1 and, b. a metallic insert molded into the plastic base, c. the outlet passage extending through the metal insert.

17. A filter for removing particulate contaminants from fluids comprising, a. the structure in accordance with claim 16 in which, b. the inlet passage extends through the metal insert.

18. A filter for removing particulate contaminants from fluids comprising, a. the structure in accordance with claim 1 in which, b. the housing is fabricated of a suitable plastic, and c. a metallic nut on the closed end of the housing, d. a body on the nut, e. a plurality of radial extensions on the body of the nut, f. the body and radial extensions being molded into the closed end of the housing.

19. A filter for removing particulate contaminants from fluids comprising, a. the structure in accordance with claim 18 and,
b. an Allen-wrench recess in the top of the metallic nut.

20. A filter for removing particulate contaminants from fluids comprising,
a. the structure in accordance with claim 18 and,
b. a Phillips-head screwdriver recess in the top of the metallic nut.

21. A filter for removing particulate contaminants from fluids comprising,
a. the structure in accordance with claim 19 and,
b. a Phillips-head screwdriver recess in the Allen-wrench recess.

22. A filter for removing particulate contaminants from fluids comprising,
a. the structure in accordance with claim 18, and
b. a plurality of intersecting flats on the housing at the top spaced apart by intervening radial recesses.

23. A filter for removing particulate contaminants from fluids comprising,
a. the structure in accordance with claim 13 in which,
b. the inlet passages are spaced radially away and equidistant from the axis of the outlet passage.

24. A filter for removing particulate contaminants from fluids comprising,
a. the structure in accordance with claim 15 and,
b. sealing ribs molded into the bottom of the base.

25. A filter for removing particulate contaminants from fluids comprising,
a. the structure in accordance with claim 1 in which,
b. the said grooves are deployed generally helically around the housing.

26. A filter for removing particulate contaminants from fluids comprising,
a. the structure in accordance with claim 6 in which,
b. the said grooves are deployed generally helically around the housing.

27. A filter for removing particulate contaminants from fluids comprising,
a. the structure in accordance with claim 8 in which,
b. the said grooves are deployed generally helically around the housing,
c. a plurality of inlet passages in the base oriented at an angle to the axis of the housing extending between its ends.

28. A filter for removing particulate contaminants from fluids comprising,
a. the structure in accordance with claim 1 and
b. a pair of spaced apart cams on the end of the housing opposite the inlet and outlet means,
c. the cams being engaged to the said end of the housing intermediate their ends,
d. the opposed ends of the respective cams being spaced away from the housing to define a radial groove.

29. A filter for removing particulate contaminants from fluids comprising,
a. the structure in accordance with claim 28 in which
b. the housing and cams are fabricated of plastic.

30. A filter for removing particulate contaminants from fluids comprising,
a. the structure in accordance with claim 14 in which,
b. the apexes of the grooves of one shell being oriented in a direction opposite the apexes of the grooves on the other shell.

* * * * *